(12) United States Patent
Delbaere et al.

(10) Patent No.: US 10,041,780 B2
(45) Date of Patent: Aug. 7, 2018

(54) POSITION SENSOR

(75) Inventors: Mickaël Delbaere, Avanne-Aveney (FR); Thierry Dorge, Arc et Senans (FR); Didier Frachon, Besançon (FR); Gérald Masson, Besançon (FR)

(73) Assignee: Moving Magnet Technologies (MMT), Besancon (FR)

( * ) Notice: Subject to any disclaimer, the term of this patent is extended or adjusted under 35 U.S.C. 154(b) by 1168 days.

(21) Appl. No.: 13/520,658

(22) PCT Filed: Sep. 23, 2011

(86) PCT No.: PCT/FR2011/052217
§ 371 (c)(1),
(2), (4) Date: Aug. 30, 2012

(87) PCT Pub. No.: WO2012/042154
PCT Pub. Date: Apr. 5, 2012

(65) Prior Publication Data
US 2013/0179117 A1   Jul. 11, 2013

(30) Foreign Application Priority Data

Sep. 29, 2010   (FR) ..................................... 10 57847

(51) Int. Cl.
*G01C 9/00* (2006.01)
*G01B 7/14* (2006.01)
(Continued)

(52) U.S. Cl.
CPC ............... *G01B 7/14* (2013.01); *G01D 5/145* (2013.01); *G01D 5/2449* (2013.01); *G01D 5/24452* (2013.01); *G01D 5/3538* (2013.01)

(58) Field of Classification Search
CPC ...... G01D 5/145; G01D 11/245; G01P 3/487; G01B 7/14
(Continued)

(56) References Cited

U.S. PATENT DOCUMENTS 3,061,771 A   10/1962  Planer et al.
4,639,667 A   1/1987   Adresen
(Continued)

FOREIGN PATENT DOCUMENTS

CN   101384883    3/2009
DE   202 10 548   8/2003
(Continued)

*Primary Examiner* — Toan Le
*Assistant Examiner* — Xiuquin Sun
(74) *Attorney, Agent, or Firm* — Harness, Dickey & Pierce, PLC

(57) ABSTRACT

The disclosure relates in particular to a method for parameterizing a system for measuring an absolute position, the system including a permanent magnet, at least one probe that is mobile relative to the magnet over a given path, and a controller providing position information calculated on the basis of the arctangent of the ratio, wherein a correction coefficient G is assigned, between the output signals of the probe, wherein the signals are pseudo-sinusoidal and squared. The method includes an optimization operation that involves selecting the value of the coefficient G that minimizes the errors of the measurement system resulting from the pseudo-sinusoidal character of the signals output from the probe.

25 Claims, 9 Drawing Sheets

(51) Int. Cl.
  *G01D 5/14* (2006.01)
  *G01D 5/244* (2006.01)
  *G01D 5/353* (2006.01)

(58) Field of Classification Search
  USPC ........................................................ 702/150
  See application file for complete search history.

(56) References Cited

U.S. PATENT DOCUMENTS

| | | | |
|---|---|---|---|
| 4,785,242 A | 11/1988 | Vaidya et al. | |
| 4,966,041 A | 10/1990 | Miyazaki | |
| 5,070,298 A | 12/1991 | Honda et al. | |
| 5,159,268 A | 10/1992 | Wu | |
| 5,200,747 A | 4/1993 | Betz et al. | |
| 5,250,925 A | 10/1993 | Shinkle | |
| 5,351,387 A | 10/1994 | Iwata et al. | |
| 5,416,410 A | 5/1995 | Kastler | |
| 5,444,313 A | 8/1995 | Oudet | |
| 5,528,139 A | 6/1996 | Oudet et al. | |
| 5,532,585 A | 7/1996 | Oudet et al. | |
| 5,670,876 A | 9/1997 | Dilger et al. | |
| 5,781,005 A | 7/1998 | Vig et al. | |
| 5,814,985 A | 9/1998 | Oudet | |
| 5,930,905 A | 8/1999 | Zabler et al. | |
| 5,942,895 A | 8/1999 | Popovic et al. | |
| 6,043,645 A | 3/2000 | Oudet et al. | |
| 6,043,646 A | 3/2000 | Jansseune | |
| 6,087,827 A | 7/2000 | Oudet | |
| 6,175,233 B1 | 1/2001 | McCurley et al. | |
| 6,219,212 B1 | 4/2001 | Gill et al. | |
| 6,304,078 B1 | 10/2001 | Jarrard et al. | |
| 6,326,781 B1 | 12/2001 | Kunde et al. | |
| 6,384,598 B1 | 5/2002 | Hobein et al. | |
| 6,466,889 B1 | 10/2002 | Schödlbauer | |
| 6,512,366 B2 | 1/2003 | Siess | |
| 6,515,571 B2 | 2/2003 | Takeda | |
| 6,518,749 B1 | 2/2003 | Oudet et al. | |
| 6,545,463 B1 | 4/2003 | Dettmann et al. | |
| 6,552,534 B2 | 4/2003 | Desbiolles et al. | |
| 6,573,709 B1 | 6/2003 | Gandel et al. | |
| 6,576,890 B2 | 6/2003 | Lin et al. | |
| 6,593,734 B1 | 7/2003 | Gandel et al. | |
| 6,731,108 B2 | 5/2004 | Zalunardo et al. | |
| 6,791,219 B1 * | 9/2004 | Eric .................. | H02K 11/0021 310/68 B |
| 6,848,187 B2 | 2/2005 | Ito | |
| 6,922,052 B2 | 7/2005 | Steinruecken et al. | |
| 6,935,193 B2 | 8/2005 | Heisenberg et al. | |
| 6,941,241 B2 | 9/2005 | Lee et al. | |
| 6,960,974 B2 | 11/2005 | Wan et al. | |
| 6,992,478 B2 | 1/2006 | Etherington et al. | |
| 7,028,545 B2 | 4/2006 | Gandel et al. | |
| 7,030,608 B2 | 4/2006 | Kawashima et al. | |
| 7,049,808 B2 | 5/2006 | Martinez et al. | |
| 7,088,096 B2 | 8/2006 | Etherington et al. | |
| 7,116,210 B2 | 10/2006 | Lawrence et al. | |
| 7,215,112 B1 | 5/2007 | Recio et al. | |
| 7,239,131 B2 | 7/2007 | Halder et al. | |
| 7,293,480 B2 | 11/2007 | Matsui et al. | |
| 7,304,450 B2 | 12/2007 | Prudham | |
| 7,363,825 B2 | 8/2008 | Feng et al. | |
| 7,421,023 B2 | 9/2008 | Kim | |
| 7,501,929 B2 | 3/2009 | Lawrence et al. | |
| 7,589,445 B2 | 9/2009 | Gandel et al. | |
| 7,644,635 B2 | 1/2010 | Prudham et al. | |
| 7,671,583 B2 | 3/2010 | Diegel et al. | |
| 7,741,839 B2 | 6/2010 | Jarrard | |
| 7,784,365 B2 | 8/2010 | Masson et al. | |
| 7,898,122 B2 | 3/2011 | Andrieux et al. | |
| 7,906,959 B2 | 3/2011 | Frachon et al. | |
| 7,923,998 B2 | 4/2011 | Hammerschmidt | |
| 8,072,209 B2 * | 12/2011 | Jerance .................. | G01D 5/145 324/207.23 |
| 8,519,700 B2 * | 8/2013 | Jerance .................. | G01D 5/145 324/207.12 |
| 2003/0155909 A1 | 8/2003 | Steinruecken et al. | |
| 2004/0130314 A1 | 7/2004 | Bossoli et al. | |
| 2005/0218727 A1 | 10/2005 | Gandel et al. | |
| 2006/0123903 A1 | 6/2006 | Gandel et al. | |
| 2007/0008063 A1 | 1/2007 | Lawrence et al. | |
| 2007/0024043 A1 | 2/2007 | Abe | |
| 2007/0090827 A1 | 4/2007 | Jarrard | |
| 2008/0150519 A1 | 6/2008 | Hoeller et al. | |
| 2008/0250873 A1 | 10/2008 | Prudham et al. | |
| 2008/0284261 A1 | 11/2008 | Andrieux et al. | |
| 2008/0314164 A1 | 12/2008 | Masson et al. | |
| 2009/0062064 A1 | 3/2009 | Kamada et al. | |
| 2010/0045275 A1 | 2/2010 | Frachon | |
| 2010/0194385 A1 | 8/2010 | Ronnat et al. | |
| 2010/0231205 A1 | 9/2010 | Jerance et al. | |
| 2010/0253324 A1 | 10/2010 | Jarrard | |
| 2011/0043194 A1 | 2/2011 | Frachon et al. | |
| 2011/0175600 A1 | 7/2011 | Jerance et al. | |
| 2011/0184691 A1 | 7/2011 | Mehnert et al. | |
| 2011/0254543 A1 | 10/2011 | Frachon et al. | |
| 2011/0267040 A1 | 11/2011 | Frachon | |
| 2012/0146627 A1 | 6/2012 | Masson et al. | |

FOREIGN PATENT DOCUMENTS

| | | |
|---|---|---|
| DE | 102 39 904 | 3/2004 |
| DE | 102006051621 | 5/2008 |
| EP | 0 273 481 | 7/1988 |
| EP | 0 665 416 | 8/1995 |
| EP | 0 800 055 | 10/1997 |
| EP | 1 014 039 | 6/2000 |
| EP | 1 074 818 | 2/2001 |
| EP | 1 219 527 | 7/2002 |
| EP | 1 353 151 | 10/2003 |
| EP | 1 477 772 | 11/2004 |
| EP | 1 532 425 | 5/2005 |
| FR | 2 670 286 | 6/1992 |
| FR | 2 724 722 | 3/1996 |
| FR | 2 764 372 | 12/1998 |
| FR | 2 790 549 | 9/2000 |
| FR | 2 809 808 | 12/2001 |
| FR | 2 845 469 | 4/2004 |
| FR | 2 893 409 | 5/2007 |
| FR | 2 893 410 | 5/2007 |
| FR | 2 898 189 | 9/2007 |
| FR | 2 919 385 | 1/2009 |
| FR | 2 923 903 | 5/2009 |
| JP | 2006-119082 | 5/2006 |
| KR | 2008-0077369 | 8/2008 |
| KR | 2008-0104048 | 11/2008 |
| WO | WO 97/16736 | 5/1997 |
| WO | WO 99/11999 | 3/1999 |
| WO | WO 2004/015375 | 2/2004 |
| WO | WO 2005/076860 | 8/2005 |
| WO | WO 2007/014599 | 2/2007 |
| WO | WO 2007/057563 | 5/2007 |
| WO | WO 2007/099238 | 9/2007 |
| WO | WO 2008/101702 | 8/2008 |
| WO | WO 2008/138662 | 11/2008 |
| WO | WO 2009/047401 | 4/2009 |
| WO | WO 2009/101270 | 8/2009 |

* cited by examiner

| Case # | Magnet dimensions LxLAxH [mm] | Space D [mm] | k=b1/a1 | G=λk | λ | Non-linearity +/-[%] for G | Non-linearity +/-[%] for k |
|---|---|---|---|---|---|---|---|
| 1 | 20x10x4 | 6.5 | 0.76 | 0.9 | 1.19 | 0.53 | 2.66 |
| 2 | 24x10x4 | 6.5 | 0.76 | 0.87 | 1.13 | 0.21 | 1.42 |
| 3 | 28x10x4 | 6.5 | 0.78 | 0.81 | 1.04 | 0.17 | 0.52 |
| 4 | 32x10x4 | 6.5 | 0.81 | 0.78 | 0.96 | 0.05 | 0.46 |
| 5 | 20x5x3 | 3.5 | 0.47 | 1.05 | 2.24 | 0.94 | 9 |
| 6 | 24x5x3 | 3.5 | 0.65 | 0.76 | 1.16 | 0.62 | 1.3 |
| 7 | 28x5x3 | 3.5 | 0.73 | 0.68 | 0.94 | 0.08 | 0.47 |
| 8 | 32x5x3 | 3.5 | 0.71 | 0.65 | 0.92 | 0.09 | 0.7 |
| 9 | 20x5x3 | 2.0 | 0.49 | 0.93 | 1.88 | 1.78 | 6.7 |
| 10 | 24x5x3 | 2.0 | 0.57 | 0.81 | 1.42 | 2.13 | 2.8 |
| 11 | 28x5x3 | 2.0 | 0.64 | 0.6 | 0.93 | 1.14 | 1.34 |
| 12 | 32x5x3 | 2.0 | 0.65 | 0.58 | 0.9 | 0.32 | 0.73 |

| Case # | Magnet dimensions LxLAxH [mm] | Space D [mm] | k=b1/a1 | G=λk | λ | Non-linearity +/-[%] for G | Non-linearity +/-[%] for k |
|---|---|---|---|---|---|---|---|
| 13 | 20x10x4 | 6.5 | 0.57 | 0.79 | 1.38 | 0.1 | 3.39 |
| 14 | 24x10x4 | 6.5 | 0.52 | 0.69 | 1.30 | 0.08 | 3.7 |
| 15 | 28x10x4 | 6.5 | 0.52 | 0.62 | 1.18 | 0.02 | 1.81 |
| 16 | 32x10x4 | 6.5 | 0.51 | 0.53 | 1.03 | 0.04 | 0.3 |
| 17 | 20x5x3 | 3.5 | 0.5 | 0.47 | 0.94 | 0.27 | 0.6 |
| 18 | 24x5x3 | 3.5 | 0.49 | 0.39 | 0.8 | 0.12 | 2.65 |
| 19 | 28x5x3 | 3.5 | 0.48 | 0.35 | 0.72 | 0.1 | 3.7 |
| 20 | 32x5x3 | 3.5 | 0.48 | 0.3 | 0.63 | 0.29 | 4.6 |
| 21 | 20x5x3 | 2.0 | 0.55 | 0.31 | 0.56 | 0.6 | 6 |
| 22 | 24x5x3 | 2.0 | 0.55 | 0.27 | 0.49 | 0.33 | 9 |
| 23 | 28x5x3 | 2.0 | 0.52 | 0.27 | 0.51 | 0.48 | 8.35 |
| 24 | 32x5x3 | 2.0 | 0.49 | 0.31 | 0.64 | 0.67 | 5.3 |

(N at center)

| Case # | Magnet Dimensions OdxIDxH [mm] | Space D [mm] | k=b1/a1 | G=λk | λ | Non-linearity +/-[%] for G | Non-linearity +/-[%] for k |
|---|---|---|---|---|---|---|---|
| 25 | 20x10x2.5 | 3.0 | 0.44 | 0.67 | 1.53 | 0.41 | 3.62 |

| Case # | Magnet Dimensions OdxIDxH [mm] | Space D [mm] | k=b1/a1 | G=λk | λ | Non-linearity +/-[%] for G | Non-linearity +/-[%] for k |
|---|---|---|---|---|---|---|---|
| 26 | 7x5x3.5 | 3.16 | 0.44 | 0.46 | 1.03 | 0.04 | 0.28 |

| | Case # | Magnet Dimensions mm] | Space D [mm] | k=b1/a1 | G=λk | λ | Non-linearity +/-[%] for G | Non-linearity +/-[%] for k |
|---|---|---|---|---|---|---|---|---|
| at center | | 90°x10x2 | 2.2 | 0.48 | 0.36 | 0.76 | 1.0 | 4.0 |
| | | 100°x10x2 | 2.2 | 0.44 | 0.41 | 0.92 | 0.65 | 1.51 |
| N | | 120°x10x2 | 2.2 | 0.55 | 0.50 | 0.92 | 0.39 | 0.9 |

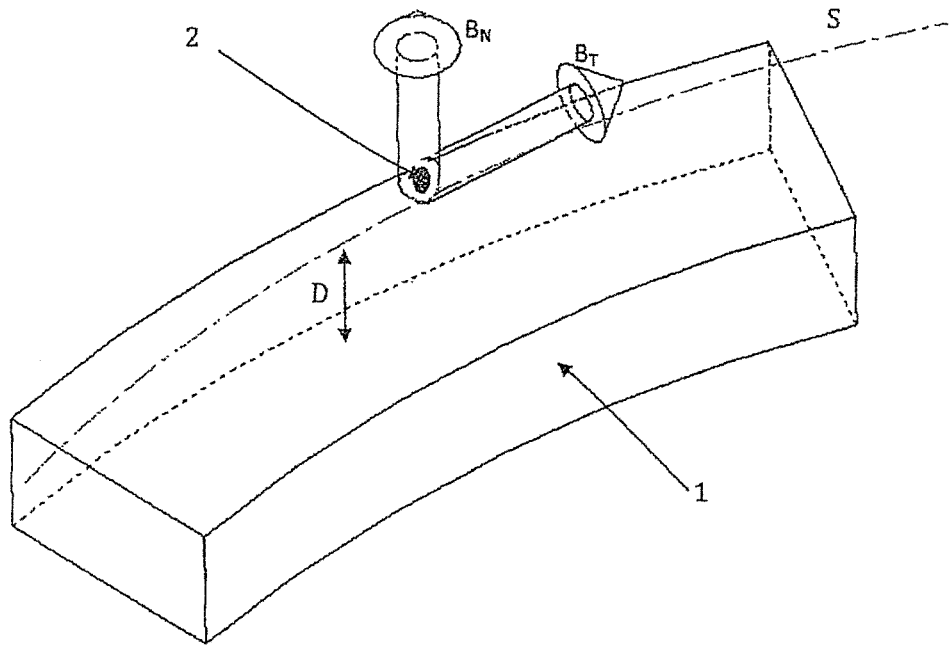
Figure 9a
| Case # | Magnet Dimensions [mm] | Space D [mm] | k=b1/a1 | G=λk | λ | Non-linearity +/-[%] for G | Non-linearity +/-[%] for k |
|---|---|---|---|---|---|---|---|
| N at center | 30°x5x3 | 2.2 | 0.53 | 0.43 | 0.81 | 0.14 | 2.53 |
| | 40°x5x3 | 2.2 | 0.52 | 0.33 | 0.63 | 0.13 | 5.3 |
| | 50°x5x3 | 2.2 | 0.45 | 0.29 | 0.65 | 0.45 | 3.7 |
| | 70°x5x3 | 2.2 | 0.71 | 0.73 | 1.03 | 0.04 | 0.24 |
Figure 9b
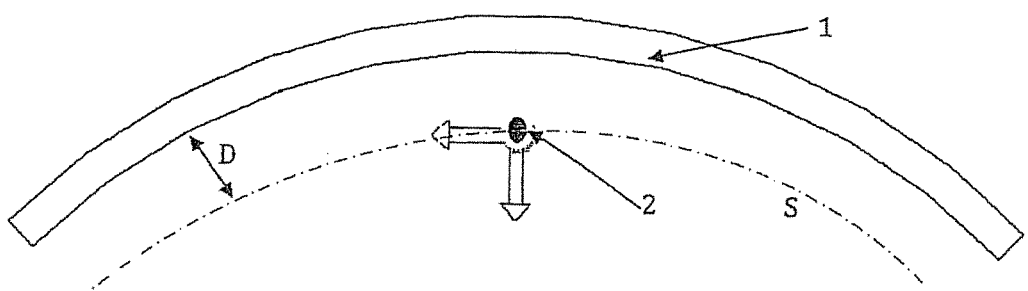
Figure 10

POSITION SENSOR

CROSS-REFERENCE TO RELATED APPLICATIONS

This application is a National Phase Entry of International Application No. PCT/FR2011/052217, filed on Sep. 23, 2011, which claims priority to French Patent Application Serial No. 1057847, filed on Sep. 29, 2010, both of which are incorporated by reference herein.

FIELD OF THE INVENTION

The present invention relates to the field of absolute position systems with magnetic sensors, intended to provide precise linear or angular position information. Such measuring systems, which require considerable robustness and great precision, are in particular used in the automobile industry.

BACKGROUND

Known in the state of the art is a solution described in U.S. Pat. No. 7,741,839 introducing the general principle of an absolute position sensor using a magnet generating a continuously variable field and a magnetic sensor delivering two electric signals representative of the magnetic components with a sinusoidal shape so as to determine the relative position of the magnet and the sensor. This patent proposes performing an arctangent calculation of the ratio between the signal delivered by the two sensors to provide an approximate position of the movable magnet. In this way, the angle of the magnetic field is measured directly at the measuring point.

The precision of the angle thus determined is not satisfactory since, in the general case, the two components of the magnetic field have very different amplitudes. As a result, the angle of the magnetic field calculated by the arctangent and the evolution of the position are not proportionate, which then leads to great imprecisions in knowledge of the position. The geometric configurations making it possible to obtain equality between the components are limited or require a significant impact on the bulk, as for example described in U.S. Pat. No. 7,030,608.

In order to improve the precision, a solution has been proposed in French patent FR2893410 consisting of applying a gain coefficient to the ratio of the signals delivered by the sensors, and a probe having two pairs of Hall elements associated with a flux concentrator. This prior art patent describes a sensor having a cylindrical magnet that is magnetized along its diameter. Detection elements are positioned on the periphery of the magnet and sense the evolution of the tangential and radial components of the magnetic field. In order to be able to decode the actual angle of rotation of the sensor, a corrective gain is applied that is equal to the ratio of the maximum amplitudes of the voltage from the tangential component to the voltage from the radial component. In this way, the non-linearity of the obtained signal is improved. However, this configuration is limited to the case of the diametrically magnetized ring.

This solution was completed by the invention described in European patent EP1989505. This patent describes a linear or rotary sensor having a magnet whereof the variation of the magnetization direction within the magnet is linearly variable. In this way, still by applying a standardization factor equal to the ratio of the amplitudes between the voltage from the radial and tangential fields, it is possible, via an arctangent calculation, to determine the angular or linear movement of the probe relative to the magnet. However, in many cases, in particular when the magnetization harmonics are significant or when the magnetization done in the material does not evolve over a whole period, applying this simple ratio does not make it possible to obtain precise enough position information.

DRAWBACKS OF THE PRIOR DEVICES

The position information provided by the sensors of the prior devices is not completely satisfactory, as it appears that the non-linearities of the magnetic and electric signals lead to insufficient precision in light of the constraints henceforth imposed by the industry. In fact, in practice, the signals actually measured are not purely sinusoidal, but have a harmonic content that may be very significant. Each of the magnetic components can then be written according to the following formulas:

$$B_1 = \sum_i a_i \cdot \sin(i \cdot \theta)$$

$$B_2 = \sum_i b_i \cdot \cos(i \cdot \theta)$$

Where:
  $B_1$ designates a magnetic component normal to the direction of movement and generated by a magnet,
  $B_2$ designates a tangential magnetic component, in quadrature, generated by the magnet,
  $\theta$ designates the electric angle, i.e. the angular position over the period of the considered signal. This is what one wishes to know and is proportional to the position of the probe relative to the magnet, not to be confused with the magnetic angle at the measuring point, which is defined as the angle between the two vectors corresponding to the two considered components,
  $a_i$ designates the amplitude of the different harmonics that make up the signal $B_1$,
  $b_i$ designates the amplitude of the different harmonics that make up the signal $B_2$,
  i designates the rank of the harmonic.

The harmonics of the signal come from different disruptions, and in particular:
  the edge effects intrinsic to the geometry of the magnet, and occurring primarily at the ends of the useful path. These edge effects are more significant as the size of the magnet in the direction of movement is closer to or even lower than the useful path. These effects may be decreased by choosing a large magnet, but this is counter to the desired miniaturization and cost reduction,
  the imperfections in the magnetization process. Producing a magnet whereof the direction varies continuously can create difficulties related to the production of the magnetization tool. It is, for example, difficult to produce magnetization varying completely linearly in the direction of movement, and the drifts lead to harmonics of the electric signal measured by the Hall effect elements,
  the relative permeability of the magnet: this relative permeability is not completely identical to that of the air, which produces parasitic diffraction phenomena between the magnet and the air, deforming the local magnetic field detected by the Hall effect elements, the non-homogeneity of the magnet: when one works with certain types of magnets, particularly bonded magnets, the material is sometimes non-homogenous, leadings to disparate magnetic properties and causing deformations of the local magnetic field, poor alignment of the Hall effect elements detecting the components of the magnetic field.

Thus, the prior devices are situated in the context of configurations where the harmonic content is weak or non-existent and where the signals summarize the expression of a fundamental. The components $B_1$ and $B_2$ described above then become:

$$B_1 = a_1 \cdot \sin(\theta)$$

$$B_2 = b_1 \cdot \cos(\theta)$$

The electric angle is then accessed simply by obtaining the quotient of $B_1$ over $B_2$, which makes it possible to arrive at the following formula:

$$\theta = A\tan\left(\frac{b_1}{a_1} \cdot \frac{B_1}{B_2}\right)$$

Knowing the electric angle at all points of the movement of the sensor thus makes it possible to access the absolute position information thereof.

Generally, when the signal is a deformed sinusoid and is not purely sinusoidal for the reasons described above, working with a small distance between the surface of the magnet and the measuring probe, i.e. close to the magnet, amplifies the harmonic content. The further one gets from the magnet, the lower its harmonic content is. However, when one wishes to work with as small a magnet as possible, the edge effects can cause a significant harmonic content even when that measuring air gap is significant. The formula given by the prior art providing the electric angle is insufficient.

Those skilled in the art have tried to improve the precision through solutions such as post-processing of the information, for example by applying a correction table allowing digital linearization processing. This solution causes excess costs and a less robust system, sensitive to mechanical variations and positioning allowances, and in particular distance variations between the magnet and the probe. Some of the parameters cited above evolve over time, and compensation by post-processing alone leads to a drift that depends on the age of the sensor.

Another solution proposed in patent FR2893410 consists of offsetting the linearity flaws through a non-constant shape of the magnet, for example through an elliptical, not a circular, section. This solution involves a more complex manufacturing method. Another solution is to apply correction coefficients by curve sector so as to improve, zone by zone and iteratively, the linearity of the sensor. However, this requires additional electronic resources, and as a solution is not very robust relative to the allowances, which leads to a solution that evolves poorly over time.

SUMMARY

The present invention aims to resolve these drawbacks by proposing an absolute measuring system with improved precision relative to the sensors of the state of the art, without requiring post-processing or particular magnet configurations. Of course, it is possible to apply additional processing to the measuring system according to the invention, but intrinsically, the measuring system according to the invention has greater precision than that of the sensors of the prior art. It is specified that the term "absolute precision" within the meaning of this patent refers to a multi-periodic measuring system. The absolute position then relates to the absolute position over a period, the information on the date of the period being determined by additional means.

Advantageously, the present invention in particular allows one skilled in the art to produce robust sensors and makes it possible, in the case of parallelepiped magnets, or magnets in the shape of an angular sector or tile, to minimize the size of the magnet relative to that of the path with the possibility of obtaining a magnet substantially smaller than the path while maintaining very good linearity. Advantageously, the present invention allows one skilled in the art to work both with small measuring air gaps, where the harmonic content is very significant, and large ones. In fact, in that case, the harmonic content is certainly much lower, but the edge effects can cause significant harmonic content when the magnet is smaller than the measured path. In the different cases cited herein, the harmonic content is non-negligible.

Most generally, the invention relates to a system for measuring an absolute position, said system comprising a permanent magnet, and at least one probe that is mobile relative to said magnet over a given path, said magnet creating a magnetic field at the probe having a first magnetic component $B_t$, said to be tangential, in the direction of travel, and a second magnetic component $B_n$, said to be normal, and orthogonal to the first component and in quadrature, said probe delivering two electric signals $V_n$, $V_t$ that depend on said components $B_n$, $B_t$, respectively, and a calculation means providing position information calculated on the basis of the arctangent of the ratio between said signals $V_n$, $V_t$ to which a correction coefficient G is assigned, characterized in that said calculation means is parameterized to apply a gain G strictly different from k to one of the signals $V_n$, $V_t$, where k designates the ratio $Vmax_t/Vmax_n$, where $Vmax_t$ and $Vmax_n$ respectively represent the amplitude of the signal $V_t$ and $V_n$ over said path, the gain G being calculated to minimize the deviations between the position values resulting from the magnetic components and the corresponding real mechanical position values.

According to a first alternative, the permanent magnet has a magnetization direction that varies continuously in the direction of movement. According to a second alternative, the permanent magnet has a unidirectional magnetization, the intensity of which varies continuously in the direction of movement.

Preferably, said calculation means is parameterized so as to apply, to one of the signals $V_n$, $V_t$, a gain G comprised between 0.4 k and 0.98 k or between 1.02 k and 2.5 k, where k designates the ratio between the amplitude of the signals $V_t$ and $V_n$. Preferably, said magnetic sensor includes at least two Hall effect sensors. Advantageously, said magnetic sensor includes at least two pairs of Hall effect elements associated with a flux concentrator such as, for example, the MLX90316 probe made by the company Melexis.

In a secondary embodiment, the probe may be a Hall effect probe without a concentrator such as, for example, the HAL3625 probe by the company Micronas. In a secondary embodiment, the probe can be of the magnetoresistance type. According to a first alternative, the permanent magnet is of the tubular type. According to a second alternative, the permanent magnet is of the semi-tubular tile-shaped type. According to a third alternative, the permanent magnet is an angular sector.

According to a fourth alternative, the permanent magnet is a parallelepiped element. According to a fifth alternative, the permanent magnet is disc-shaped. According to one particular embodiment, the magnet is magnetized diametrically. According to one particular embodiment, the magnet is tubular and magnetized diametrically.

The magnetization, the direction of which varies continuously, can have a favored direction in an area situated along the measuring dimension. It is for example possible to impose, at the center of the magnet, a normal or tangential magnetization depending on whether a magnetic interference field (coming from a cable, for example) is applied on the magnet and whether one wishes to minimize the effect thereof so as to preserve a non-deteriorated precision under all circumstances in that median position of the magnet. Knowing the direction of the interference field at the center of the magnet then makes it possible to choose the direction of the magnetization at the center of the magnet wisely. Thus, if the interference field has a direction tangential to the middle of the movement, one will choose a magnetization having a direction tangential to the middle of the magnet. Of course, the example proposed above is in no way limited to the middle position of the path of the sensor and can be considered at any point on the sensor's path.

According to one particular embodiment, the permanent magnet is magnetized with a direction varying between a normal central direction and directions tangential to the ends of the path, the total rotation of the electric angle over the path being substantially equal to 180°. According to another particular embodiment, the permanent magnet is magnetized with a direction varying between a tangential central direction and directions tangential to the ends of the path, the total rotation of the electric angle over the path being smaller than 360°.

In the case of a non-tubular magnet, the magnetization type (normal to the middle or tangent to the middle) and the total rotation of the magnetization on the magnet will be determined according to the size constraints and the desired performance. The tables of FIGS. 4 and 5 show several examples for a given path and fixed dimensions of the magnet. These tables show that according to a desired magnet size, the choice of a type of magnetization is guided, inter alia, by the performance obtained over the non-linearity.

According to one alternative, the magnet is of the anisotropic type, the direction of the magnetization being aligned with the direction of the anisotropy. Preferably, the magnet has an anisotropy whereof the direction of anisotropy varies continuously along the path of the magnet.

The invention also relates to a method for parameterizing a system for measuring an absolute position consisting of determining the maximum value $Vmax_n$, $Vmax_t$ of said signals $V_n$, $V_t$ over the useful path, calculating a coefficient k equal to the ratio $Vmax_t/Vmax_n$, and setting a gain coefficient G that is strictly different from k through a global minimization of the difference between the real position and the calculated position before the arctangent calculation. The invention also relates to a method for implementing a system for measuring an absolute position of the type described above, comprising a magnet and a probe, and in which the signals Vn and Vt are deformed or pseudo-sinusoidal sinusoids and not pure sinusoids, said method including a preliminary calibration operation consisting of establishing, through measurement or simulation and for a plurality of different relative positions of the probe and the magnet, a law linking the measurement X of each of these relative positions to the ratio Vn/Vt of the electric signals Vn and Vt obtained for this relative position X, a preliminary optimization operation consisting of determining the value of the gain G for which the deviations, obtained for the plurality of relative positions, between the different measurements of X and the different corresponding values of the function $C \cdot Arctg(G \cdot Vn/Vt)$ where C is a known construction constant, are minimal, and a subsequent exploitation operation, implemented during the use of that system, and consisting of comparing the measurement X of any relative position of the probe and the magnet to the value of the function $C \cdot Arctg(G \cdot Vn/Vt)$.

In such an embodiment, and as one skilled in the art will understand upon reading this description, the preliminary calibration and optimization operations constitute a method for parameterizing the concerned system for measuring an absolute position. Furthermore, the construction constant C is defined by the magnetization pitch of the magnet and represents the ratio of the distance of a relative movement of the probe and the magnet to the corresponding variation of the angle $Arctg(G \cdot Vn/Vt)$.

BRIEF DESCRIPTION OF THE DRAWINGS

The present invention will be better understood upon reading the description of non-limiting embodiments, in reference to the appended drawings, where:

FIGS. 9a and 9b respectively show a diagrammatic view of a second measuring system having a tile and the results in terms of non-linearity;

FIG. 10 shows a diagrammatic view of a third measuring system having a tile;

DETAILED DESCRIPTION

Figure 1:
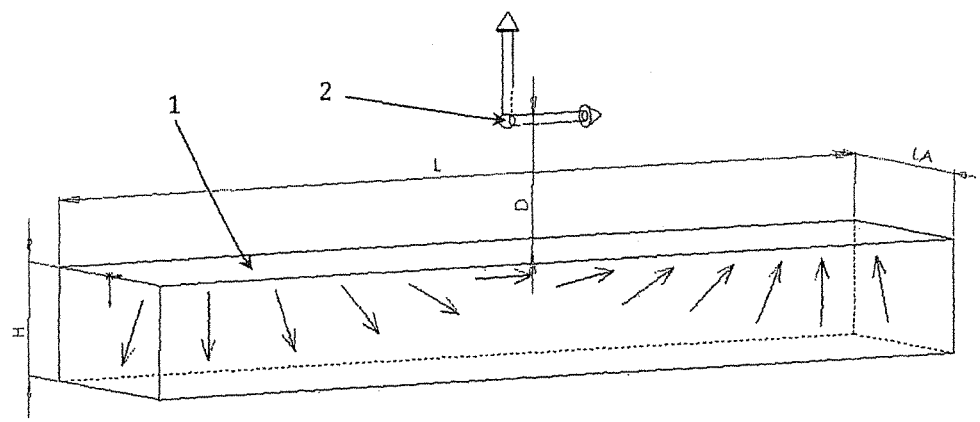
FIG. 1 shows a diagrammatic view of a measuring system including a parallelepiped magnet having a magnetization whereof the direction varies continuously.

FIG. 1 shows a diagrammatic view of a first embodiment of a system for measuring a linear absolute position, with a parallelepiped magnet (1). This example involves producing a linear position sensor over a 28 mm path with a magnet (1) having a smaller length (L), set at 24 mm. The interest of this arrangement is therefore a gain in terms of material and bulk, and thus cost and mass. In this FIG. 1, the magnet (1) has a width (LA) of 5 mm and a height (H) of 3 mm. It should be noted that the width and the height of the magnet (1) have little influence on the harmonic content, and will simply influence the amplitude of the obtained signals. This magnet (1) is magnetized with a magnetization direction that is continuously variable inside the magnet over an angle of close to 180°. This angle has been analytically determined to be that making it possible to obtain the best results in terms of non-linearity. Above this magnet (1), at a distance (D) of 3.5 mm from the upper surface, is a probe (2) containing magneto-sensitive detection means capable of detecting the amplitude Bt and Bn of the magnetic field over two perpendicular axes, respectively the tangential component and a normal component of the magnetic field, defined relative to the direction of movement, at that point in space. It should be noted that said detection means can be shifted from the plane of symmetry of the magnet (1) along dimension (LA) so as to exploit the tangential and axial magnetic components rather than the tangential and normal ones.

Figure 2:
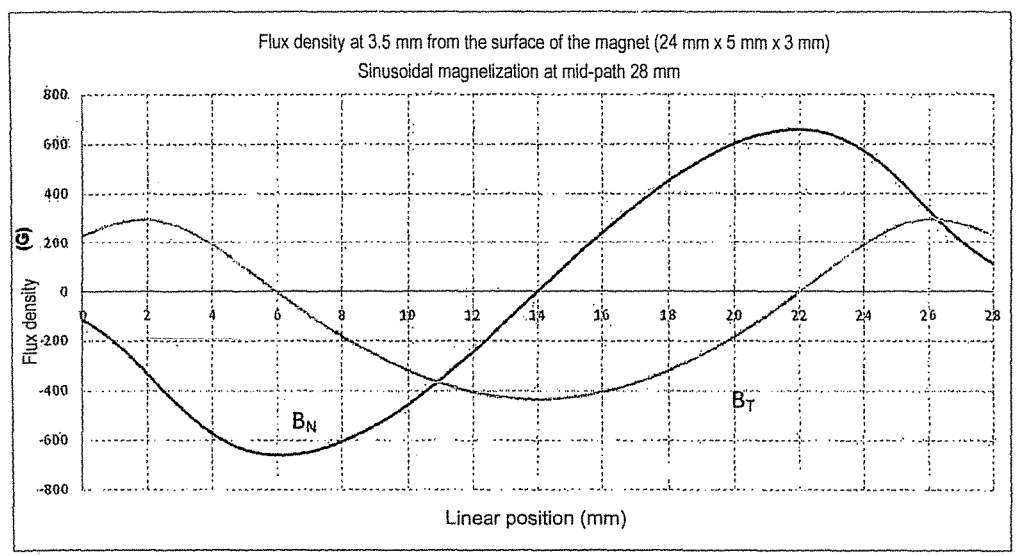
FIG. 2 shows the magnetic inductions measured in the vicinity of the magnet of FIG. 1.

FIG. 2 shows the results of induction measurements, in the case of FIG. 1, of the normal ($B_N$) and tangential ($B_T$) magnetic field components at the point where the magnet (1) is positioned as a function of the relative position of the probe in relation to the Hall elements of the detection means (2). In this configuration, the tangential and normal signals are substantially different from two sinuses phase-shifted by 90° because the harmonic content is high, in particular due to the edge effects, but more generally for the various reasons explained above. In fact, if the position is calculated based on an arctangent calculation between the two components (as described in U.S. Pat. No. 7,741,839), as shown in FIG. 3a, or if a coefficient k is applied beforehand equal to the ratio of the amplitudes $Vmax_t/Vmax_n$, as described in EP1989505, as shown in FIG. 3b, this leads to significant imprecisions.

Figure 3A:
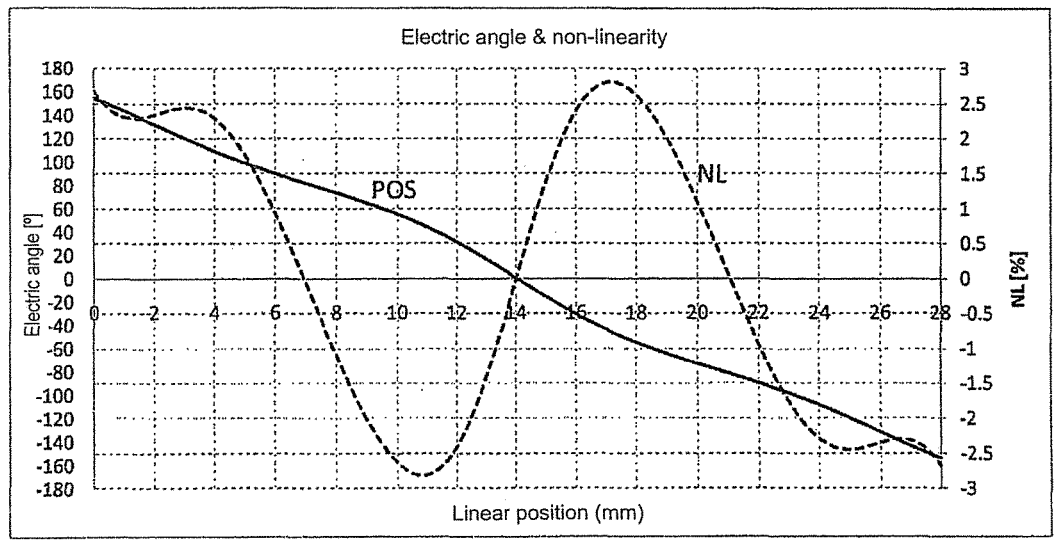
FIGS. 3a, 3b and 3c show the calculated electric angle and the non-linearity results obtained depending on the type of coefficient applied to the ratio of the inductions of FIG. 2.

In FIG. 3a, the curve POS shows the calculated electric angle, image of the position, from the arctangent calculation applied to the ratio of the signals of FIG. 2, without applying a gain. The signal NL represents the non-linearity of the signal POS as a function of the real mechanical position. As one can see, the results are poor, since the non-linearity obtained on the signal is +/−2.8%.

Figure 3B:
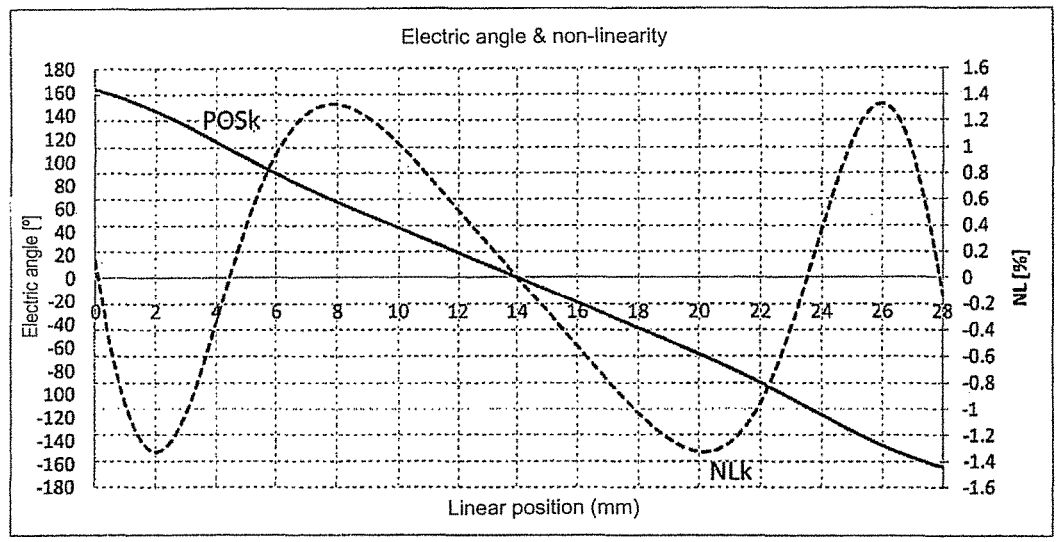

In FIG. 3b, the gain applied to the normal and tangential components, before the arctangent calculation, is equal to the ratio of the amplitudes of those components. According to FIG. 2, using 433 Gauss as the amplitude of the tangential signal and 660 Gauss as the amplitude of the normal signal, this gain value is therefore close to 0.65 (433/660). Applied to the ratio of the components over the path and through the arctangent calculation, the calculated position, POSk, with this ratio has a non-linearity, denoted NLk, of +/−1.3%. In many applications, such a non-linearity is not acceptable. One skilled in the art will therefore tend to correct that non-linearity using the different techniques described above.

To that end, the arctangent calculation is applied not to the ratio of the electric signals detected by the Hall effect elements, or to the signals weighted by the simple ratio k of the amplitudes $Vmax_t/Vmax_n$, but by signals weighted using a gain coefficient G specific to the invention. In fact, in the case where these electric signals are deformed sinusoids and not pure sinusoids, this gain coefficient, although potentially close to the ratio of the amplitudes $Vmax_t/Vmax_n$, is always different from that ratio. The exact value of this coefficient is determined by an optimization algorithm applied to the simulated calculated magnetic position and real mechanical position data. The deviations are minimized between the magnetic position and mechanical position values, to determine the gain coefficient G that will be used for the calculation means of the measuring system.

In the event it is not possible to obtain the induction fields by simulation, or when a positioning defect of the probes must be corrected, the components are measured on a prototype as a function of the real mechanical position, that mechanical position being measured using a calibrated position sensor. As before, the deviations are then minimized between the magnetic position values calculated by arctangent of the ratio Vn/Vt and the mechanical position values, to determine the gain coefficient G that will be used for the calculation means of the measuring system.

Figures 3C, 4:
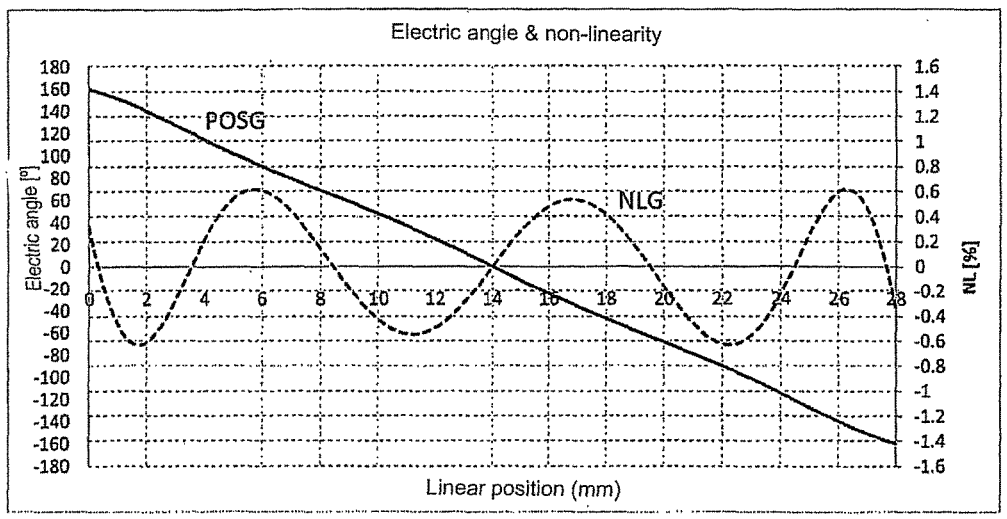
FIG. 4 shows a table summarizing, for a parallelepiped magnet, the performance and corrective parameters to be applied for cases where the magnetization is tangential to the middle of the magnet.

FIG. 3c shows the results in terms of output signal and non-linearity of that signal, still in the scenario of FIG. 1, but applying the method proposed in the invention. The signal POSG shows the signal obtained by the arctangent calculation of the ratio of the voltages that are images of the tangential and normal components to which a gain G is applied. If a gain G equal to 0.76 is applied, the non-linearity of the obtained position signal, denoted NLG, is thus lowered to +/−0.62%, or a value two times lower than that obtained with only the gain of the ratio of the amplitudes.

The example related to the embodiment of FIG. 1 is in no way limiting; different magnet sizes and measuring conditions use a different corrective gain value. The various tests that have been done show that this gain G evolves either below the value k of the ratio of the amplitudes in a range of 0.4 k to 0.98 k, or above the value of k in a range of 1.02 k to 2.5 k, knowing that if the harmonic content is non-negligible, the coefficient G will be very different from k.

FIG. 4 shows a table summarizing tests done to look for a linear position sensor with a path of 28 mm in the case where the magnetization direction is tangent to the middle of the parallelepiped magnet so as to show the evolution of the results and the difference with the gain k recommended by the prior art and the optimum corrective gain G to be applied to the ratio of the normal and tangent components so as to obtain the best results in terms of non-linearity of the signal obtained over the path. The first column (dimensions) shows the dimensions of the different considered geometric cases. Each time, it involves a parallelepiped magnet whereof the length evolves from 20 mm to 32 mm. The second column (air gap) shows the measuring air gap or distance (D) between the surface of the magnet and the detection means. The third column shows the evolution of the coefficient k as calculated according to the invention of the prior art corresponding to the ratio of the tangential ($b_1$) and normal ($a_1$) amplitudes. The fourth column shows the evolution of the coefficient G recommended by the present invention and equal to λ times the value of k. The fifth column shows the value of λ. The sixth column shows the value of the non-linearity obtained over the 28 mm path using the corrective coefficient G, while the seventh column shows the non-linearity obtained over the 28 mm path obtained using the corrective coefficient k of the prior art.

All of these concrete cases, which are non-limiting but typical examples, show that, for each of them, the non-linearity obtained with the coefficient k of the prior art can be substantially improved by using the coefficient G strictly different from k. This table of FIG. 4 shows in particular that it is possible to produce a sensor whereof the length is much smaller than the path while ensuring very good linearity.

Taking the example of "case 5," the length of the magnet is 20 mm, or much smaller than the 28 mm path. Using the corrective coefficient k of 0.47 recommended by the prior art, the best non-linearity obtained is +/−9%. This value is incompatible with the industrial specifications. Using a corrective coefficient G of 1.05, the best non-linearity obtained is then +/−0.94%. The prior art prohibited the use of such a configuration where the magnet is much smaller than the path, whereas, using the corrective coefficient recommended by the invention, it is possible to make the solution viable.

Figures 5, 6A:
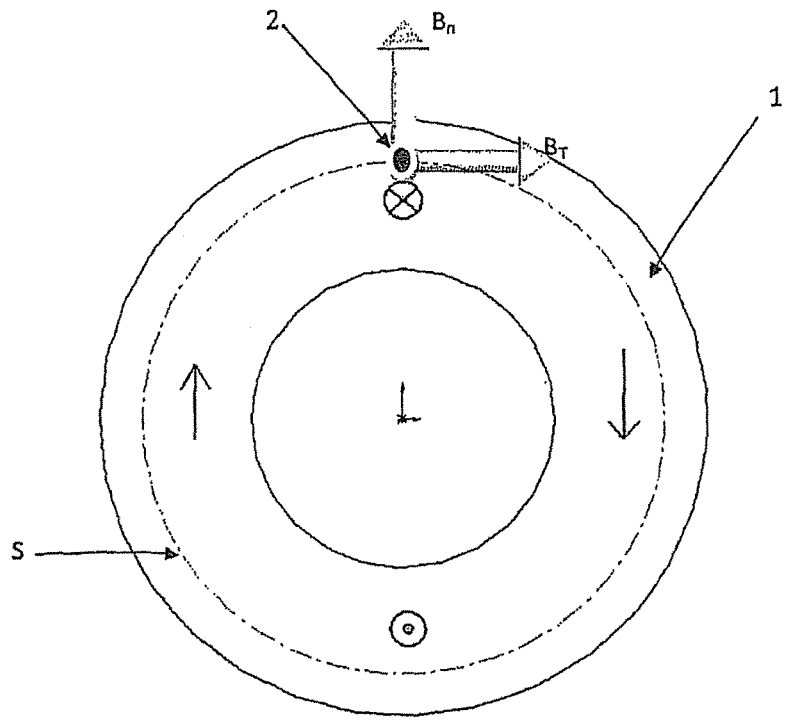
FIG. 5 shows a table summarizing, for a parallelepiped magnet, the performance and corrective parameters to be applied for cases where the magnetization is normal to the middle of the magnet.
FIGS. 6a, 6b and 6c respectively show a diagrammatic view of a measuring system including a disc magnet, the inductions at the measuring point, and the results in terms of non-linearity.

FIG. 5 shows a table summarizing the tests done to look for a linear position sensor with a 28 mm path in the case where the magnetization direction is normal to the middle of the parallelepiped magnet. The same columns as those already shown in the table of FIG. 4 are visible in this table. The reader can thus observe the influence and interest of producing a magnetization normal or tangent to the middle of the magnet (1) as a function of the scenarios considered.

For example, consider "case #14." This is a magnet (1) with a length of 24 mm, therefore smaller than the path, for which the measuring distance is 6.5 mm above the magnet, or a relatively large distance. Using the corrective coefficient k recommended by the prior art of 0.52, the best non-linearity obtained is +/−3.7%. This value is incompatible with most of the industrial specifications. Using a corrective coefficient G that is 1.30 times higher, or equal to 0.69, the best non-linearity obtained is then +/−0.08%. Looking at the table of FIG. 4 relative to the cases where the magnetization direction is tangent to the middle, one can see that the best result obtained is +/−0.21% for a coefficient G of 0.87. Thus, by producing a magnetization normal to the middle of the magnet (1), a sensor is obtained whereof the size of the magnet (1) is minimized while keeping the possibility of working at a significant distance from the magnet and ensuring a minimal non-linearity and compatible with the strictest specifications.

Still in table 5, consider another embodiment. "Case 20" represents a case where the magnet is larger than the path (length 32 mm). By working at a distance of 3.5 mm from the magnet, we can improve the non-linearity going from +/−4.6% for the case of a coefficient k of 0.48 to a non-linearity of +/−0.29% for a corrective coefficient G of 0.3. It is thus possible to produce a sensor with improved precision even when the magnet has a length longer than the path.

This table of FIG. 5 advantageously makes it possible to determine a particularly optimal case where the constraints are severe. "Case #21" corresponds to a case where the measurement air gap is small (2 mm), and where the magnet (1) has a length much smaller than the path (20 mm for a 28 mm path). In that case, the edge effects are significant and the proximity between the probe (2) and the magnet (1) make the harmonic content very rich. With a corrective coefficient k of the prior art of 0.55, the best non-linearity obtained is +/−6%, while the non-linearity obtained with a corrective coefficient G of 0.31 is equivalent to +/−0.6%. We have thus produced a high-precision sensor with a smaller magnet and working with a small measuring air gap.

FIG. 6a shows a diagrammatic view of a first embodiment of a system for measuring an absolute angular position, with a disc magnet. The magnetization, the direction of which varies continuously along the thickness of the magnet (1), performs a 360° rotation. The probe is positioned on the circle denoted (S), concentric to the magnet (1) and above the magnet (1), and representing the virtual path on which the probe (2) moves relative to the magnet (1) or the magnet (1) relative to the probe (2). The components used to calculate the absolute position are the tangential and normal electric components, denoted Vt and Vn, images of the magnetic components Bt and Bn.

Figures 6B, 6C:
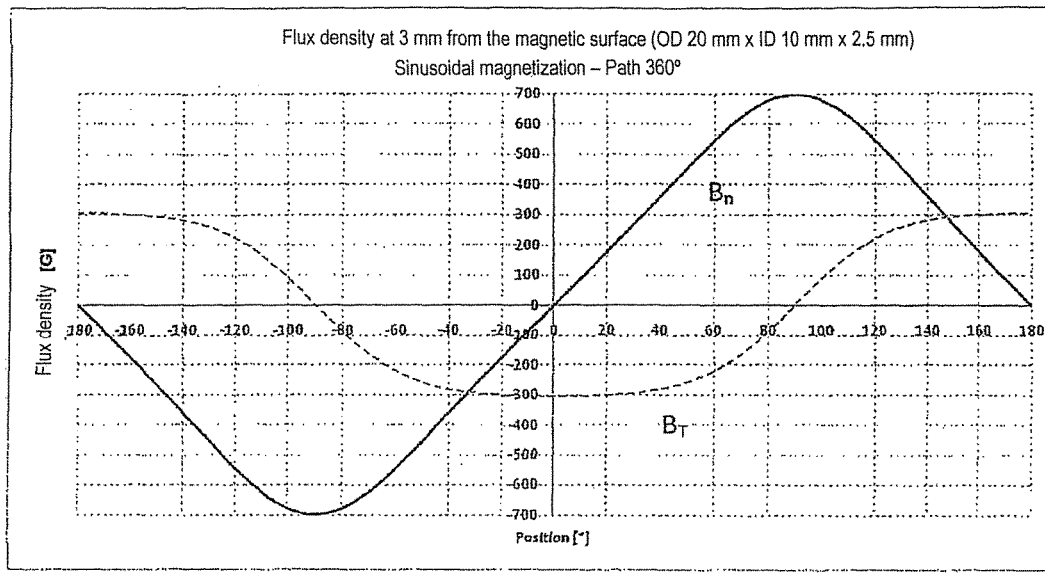

In FIG. 6b, the components Bt and Bn are illustrated over 360° of mechanical angular travel as seen by the probe (2) positioned at a distance (D) of 3 mm from the surface in the case of a magnet (1) with an outer diameter of 20 mm, an inner diameter of 10 mm, and a thickness of 2.5 mm. One can see that these signals contain a harmonic of rank i=3 that tends to generate a triangular and trapezoidal deformation depending on the component. In FIG. 6c, one can again see the contribution of the coefficient G as claimed by the invention, which makes it possible to obtain a non-linearity of the sensor of +/−0.4% versus +/−3.6% according to the proposal of the prior art. The applied coefficient is then 0.67 versus 0.44 for the simple ratio of the amplitudes of the two signals.

Figure 7A:
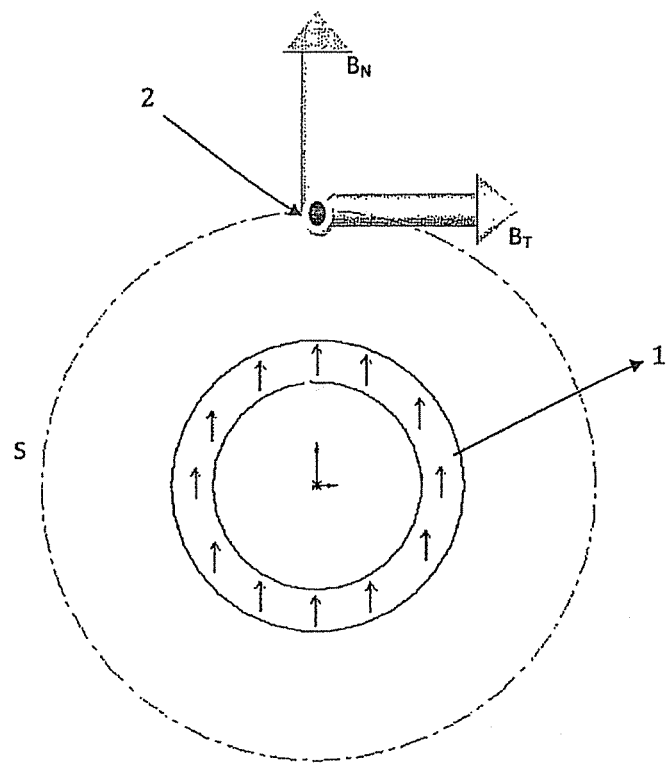
FIGS. 7a, 7b and 7c respectively show a diagrammatic view of a measuring system having a tubular magnet, the inductions at the measuring points, the results in terms of non-linearity.

FIG. 7a shows a diagrammatic view of a first embodiment of a system for measuring an absolute angular position, with a tubular magnet (1). The magnetization, the direction of which, as seen by the probe (2), varies continuously inside the magnet (1), causes a 360° rotation over the complete angular path of 360°. The probe (2) is positioned on the circular trajectory denoted (S), concentric to the magnet (1) and advantageously positioned in the height (H) of the magnet (1). The components used to calculate the absolute position are the tangential and normal electric components denoted Vt and Vn, images of the magnetic components Bt and Bn. Depending on the altitude of the reading diameter (S), it is advantageously possible to choose the axial (Va) and tangential (Vt) components for reasons of induction amplitude or precision of the sensor.

Figure 7B:
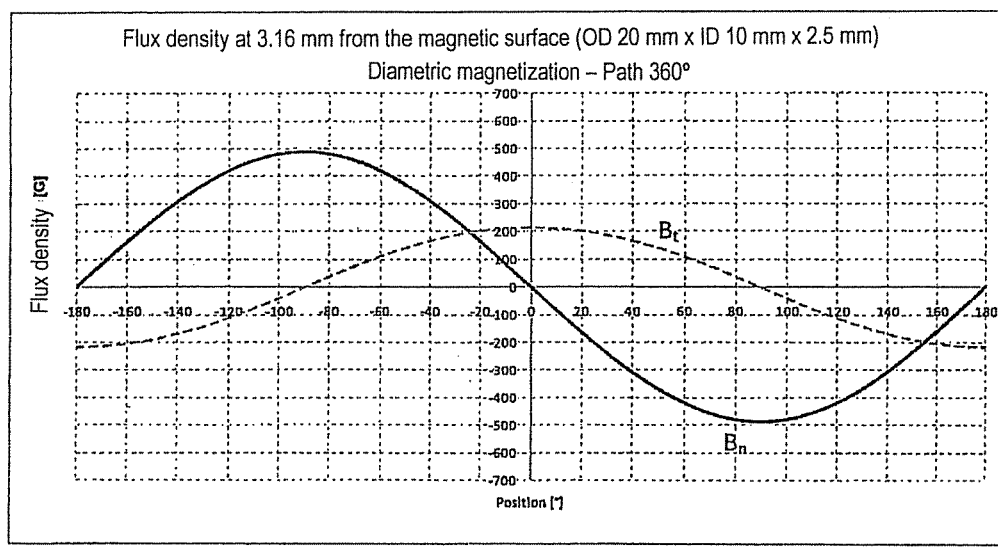
Figures 7C, 8A, 8B:
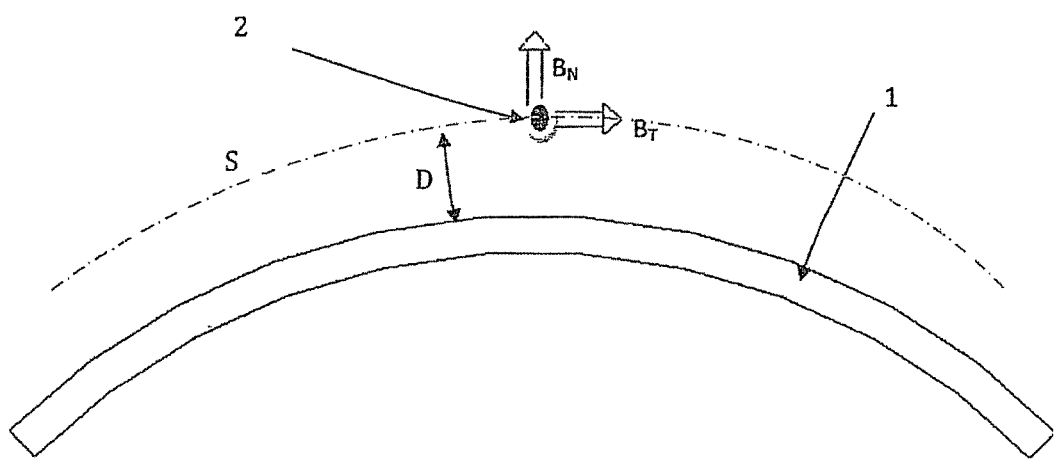
FIGS. 8a and 8b respectively show a diagrammatic view of a first measuring system including a tile and the results in terms of non-linearity.

FIG. 7b shows, over 360° of angular mechanical travel, the components Bt and Bn as seen by the probe (2) positioned at a distance (D) of 3.16 mm from the surface in the case of a magnet (1) with an outer diameter of 7 mm, an inner diameter of 5 mm, and thickness of 3.5 mm. It will be noted that these curves, which at first appear to have a completely sinusoidal profile, have a very low harmonic content. FIG. 7c nevertheless shows that although the difference between the claimed coefficient (G) and the coefficient (k) of the prior art is small, since it is equal to 1.03 due to a low harmonic content in particular due to the geometry of the magnetization tool and the permeability of the magnet, its contribution is indeed noteworthy with a non-linearity of the sensor that is improved from +/−0.3% to +/−0.4%.

FIG. 8a shows a diagrammatic view of a first embodiment of a system for measuring an absolute angular position, with a tile magnet. The magnetization direction varies continuously inside the magnet (1) along the direction of movement and the complete angular path studied is 80°. The probe (2) is positioned in front of the magnet (1) over a trajectory (S) corresponding to a larger diameter than the outer diameter of the magnet (1), concentric to the magnet (1) and advantageously positioned in the height (H) of the magnet (1). The components used to calculate the absolute position are the tangential and normal electric components denoted Vt and Vn, images of the magnetic components Bt and Bn. Depending on the altitude of the reading diameter (S), it is advantageously possible to choose the axial (Va) and tangential (Vt) components for reasons of induction amplitude or precision of the sensor.

FIG. 8b shows the improvements made by using a gain G according to the invention relative to using a coefficient k according to the prior art. For an angular magnet length (1) of 90°, 100° and 120°, the best non-linearity obtained respectively goes from +/−4% to +/−1%, from +/−1.51% to +/−0.65%, and from +/−0.9% to +/−0.39%.

FIG. 9a shows a diagrammatic view of a second embodiment of a system for measuring an absolute angular position, with a tile magnet. The magnetization direction varies continuously inside the magnet (1) in the direction of travel and the complete angular travel studied is 40°. The probe (2) is positioned in front of the magnet (1), at the distance (D) from the magnet (1), over an arc of circle-shaped trajectory (S), concentric to the magnet (1). The components used to calculate the absolute position are the tangential and normal electric components denoted Vt and Vn, images of the magnetic components Bt and Bn. According to the reading diameter (S), it is advantageously possible to choose the axial (Va) and tangential (Vt) components for reasons of induction amplitude or precision of the sensor.

FIG. 9b shows the improvements made by using the gain G according to the invention relative to using the coefficient k of the prior art. For an angular magnet (1) length of 30°, 40°, 50° and 70°, the best non-linearity obtained respectively goes from +/−2.53% to +/−0.14%, from +/−5.3% to +/−0.13%, from +/−3.7% to +/−0.45%, and from +/−0.24% to +/−0.04%.

FIG. 10 shows a diagrammatic view of a third embodiment of a system for measuring an absolute angular position, with a tile magnet. In that case, the probe (2) is positioned on a trajectory (S), concentric to the curve radius of the magnet (1), but over a smaller radius than said curve radius. In fact, a trajectory (S) with a smaller radius than the curve radius causes different results in terms of corrective factor to be applied due to the fact that the developed movement is less significant than if the trajectory (S) has a larger radius than the curve radius of the magnet (1).

Figure 11:
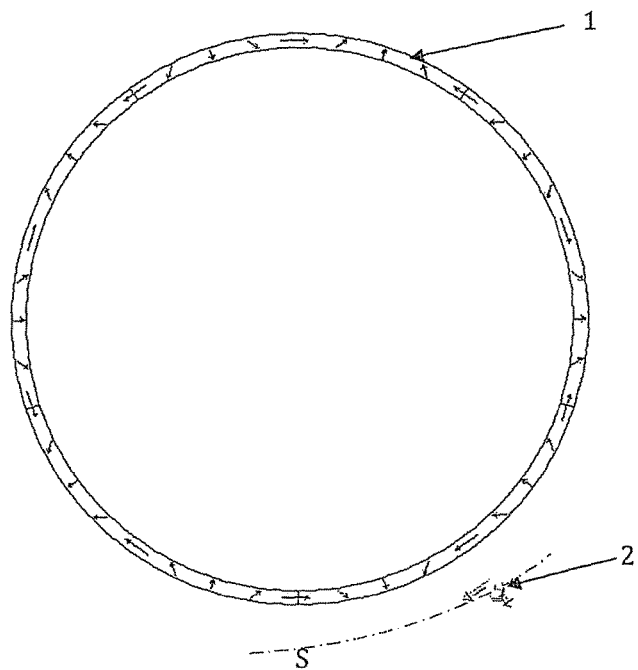
FIG. 11 shows a diagrammatic view of a measuring system having a multi-periodic ring.

FIG. 11 shows a sensor configuration according to the invention made up of a ring magnet (1) having a multi-polar magnetization whereof the direction varies continuously. It is in fact possible to see that the ring has 5 magnetized periods with a mechanical angle of 72°. Over each period, one can see that the rotation of the magnetization direction is equivalent to 360°. The probe (2) positioned near the surface of the magnet thus makes it possible to decode the angular position over the 5 periods when the magnet is rotated relative to the probe or the probe relative to the magnet. The position sensor then no longer provides an absolute position over a 360° angle of rotation, but an absolute position over a period of 72°. This type of multipolar magnet configuration for example makes it possible to provide an absolute position over the electric period of a motor. The precision of the coder influences the output of the motor or the stability of the dynamic torque provided by the latter. The invention makes it possible to improve these two factors by using the adapted gain.

Figure 12:
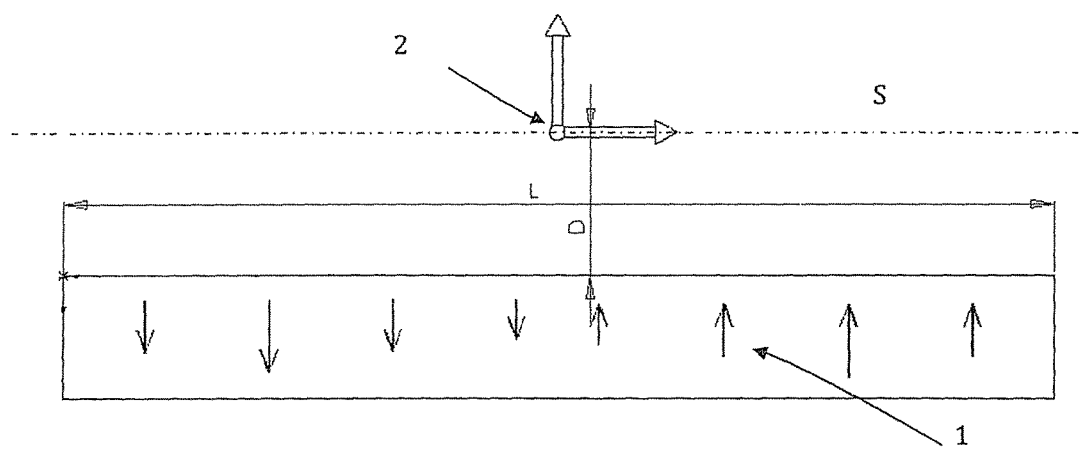
FIG. 12 shows a diagrammatic view of a measuring system having a magnet with unidirectional magnetization but having a variable intensity depending on the direction of movement.

FIG. 12 shows an alternative of the magnetization type. Unlike the magnetization whereof the direction varies continuously, the magnetization proposed here is done by means of a modulation of the magnetization amplitude, which varies continuously according to a single direction, that corresponding to the movement of the sensor. Here again, even if this magnetization makes it possible to obtain quasi-sinusoidal electric signals, the introduction of a gain different from the ratio of the amplitudes of the two signals measured before calculating the arctangent does not allow increased precision.

The present invention, outlined here and illustrated over several examples, is of course not limited to sensors in one direction of movement. Based on the same principle as that described above for a direction of movement, a sensor following two directions of movement (called 2D sensor) can be made using one or more probes by using the three components (tangential and the two normals) of the magnetic field created at the measurement point.

The invention claimed is:

1. An automobile system for measuring an absolute position, said system comprising:
    a permanent automobile magnet;
    at least one automobile probe that is mobile relative to said magnet over a given path;
    said magnet creating a magnetic field at said probe having a first magnetic component $B_t$, tangential, in a direction of travel, and a second magnetic component $B_n$, normal, and orthogonal to said first magnetic component $B_t$ and in quadrature, said probe delivering two electric signals $V_n$, $V_t$ that depend on said magnetic components $B_n$, $B_t$, respectively; and
    an automobile controller calculating position values based on an arctangent of a ratio between said signals $V_n$, $V_t$ to which a correction coefficient G is assigned to compensate for harmonics due to edge effects or imperfection of magnetization;
    said controller operably applying said correction coefficient G to one of said signals $V_n$, $V_t$, where said correction coefficient G is different than k, where k designates a ratio $Vmax_t/Vmax_n$, where $Vmax_t$ and $Vmax_n$ respectively represent an amplitude of said signals $V_t$ and $V_n$ over said path; and
    said correction coefficient G being calculated to minimize deviations between said position values resulting from said magnetic components $B_n$, $B_t$ and corresponding real mechanical position values.

2. The system for measuring an absolute position according to claim 1, wherein said permanent magnet has a magnetization direction that varies continuously in said direction of movement.

3. The system for measuring an absolute position according to claim 2, wherein said permanent magnet is magnetized with a direction varying between a normal central direction and directions tangential to ends of said path, and a total rotation of the electric angle over the path being substantially equal to 180°.

4. The system for measuring an absolute position according to claim 2, wherein said permanent magnet is magnetized with a direction varying between a tangential central direction and directions tangential to ends of said path, and a total rotation of the electric angle over the path being smaller than 360°.

5. The system for measuring an absolute position according to claim 1, wherein said permanent magnet has a unidirectional magnetization, the intensity of which varies continuously in said direction of movement.

6. The system for measuring an absolute position according to claim 1, wherein said correction coefficient G is between 0.4 k and 0.98 k.

7. The system for measuring an absolute position according to claim 1, wherein said correction coefficient G is between 1.02 k and 2.5 k.

8. The system for measuring an absolute position according to claim 1, wherein said probe includes at least two Hall effect sensors.

9. The system for measuring an absolute position according to claim 1, wherein said probe includes at least two pairs of Hall effect elements associated with a flux concentrator.

10. The system for measuring an absolute position according to claim 1, wherein said permanent magnet is tubular.

11. The system for measuring an absolute position according to claim 1, wherein said permanent magnet is semitubular and tile-shaped.

12. The system for measuring an absolute position according to claim 1, wherein said permanent magnet is disc-shaped.

13. The system for measuring an absolute position according to claim 1, wherein said permanent magnet is an angular sector.

14. The system for measuring an absolute position according to claim 1, wherein said permanent magnet is parallelepiped.

15. The system for measuring an absolute position according to claim 1, wherein said magnet is anisotropic, the direction of the magnetization being aligned with the direction of the anisotropy.

16. The system for measuring an absolute position according to claim 15, wherein said magnet has an anisotropy whereof the direction varies continuously along the path of the magnet.

17. The system for measuring an absolute position according to claim 1, wherein the controller calculates the position values resulting from the magnetic components $B_n$, $B_t$ based on the arctangent of the product of the correction coefficient G and the ratio between said signals $V_n$, $V_t$.

18. The system for measuring an absolute position according to claim 17, wherein the controller calculates the value of the correction coefficient G to minimize the deviations between the position values resulting from the magnetic components $B_n$, $B_t$ and the corresponding real mechanical position values.

19. A method of using a measuring system, the method comprising:
    determining a maximum value $Vmax_n$, $Vmax_t$ of signals $V_n$, $V_t$ obtained from an automobile sensor over a useful path of the automobile sensor relative to an automobile permanent magnet;
    calculating a coefficient k equal to the ratio $Vmax_t/Vmax_n$ using an automobile controller;
    setting a gain coefficient G to a value that is different from k through a global minimization of a difference between a real position and a calculated position of one of the sensor and the permanent magnet relative to the other one of the sensor and the permanent magnet, before an arctangent calculation by the automobile controller;
    the magnet having: (a) a length of a smaller size than an associated travel path, or (b) a radius smaller than a probe trajectory radius; and
    the automobile controller using an optimization algorithm which performs the calculating of the gain coefficient G.

20. The method according to claim 19, further comprising measuring the signals Vn and Vt, calculating a magnetic position by arctangent of the ratio Vn/Vt, and minimizing deviations between the magnetic position values calculated by arctangent and the real mechanical position values, to determine the gain coefficient G.

21. The method of claim 19, further comprising using the automobile sensor to assist in determining an absolute position of the permanent magnet over an automobile electric motor rotation of less than 360°.

22. A method for measuring an absolute position, the method comprising:
    a preliminary calibration operation including obtaining, through measurement or simulation and for a plurality of different relative positions of a probe and a magnet, a measurement X of the relative positions of the probe and the magnet, and establishing a law linking the measurement X of each of these relative positions to the arctangent of the product of a gain G and the ratio Vn/Vt of the electric signals Vn and Vt obtained for the measurement X;
    a preliminary optimization operation including determining the value of the gain G that minimizes the deviations between (i) the different measurements X for the plurality of relative positions and (ii) the corresponding values of the function C·Arctg(G·Vn/Vt), where C is a known construction constant;
    a subsequent exploitation operation including comparing the measurement X of any relative position of the probe and the magnet to the value of the function C·Arctg (G·Vn/Vt);
    producing a magnetization normal to a middle of the magnet;
    the probe using tangential and normal electric components (Vt and Vn) to assist in calculating the absolute position of the magnet relative to the probe for an electric motor rotation of less than 360°; and
    applying corrective parameters to compensate for magnetic harmonics of the magnet.

23. The method according to claim 22, further comprising obtaining the measurements X using an automobile computer that simulates the induction fields created by the magnet.

24. The method according to claim 22, further comprising obtaining the measurements X using the probe which is a position sensor that is calibrated independent of the method.

25. The method of claim 22, wherein the probe, magnet and electric motor are part of an automobile.

* * * * *